United States Patent Office 3,116,558
Patented Jan. 7, 1964

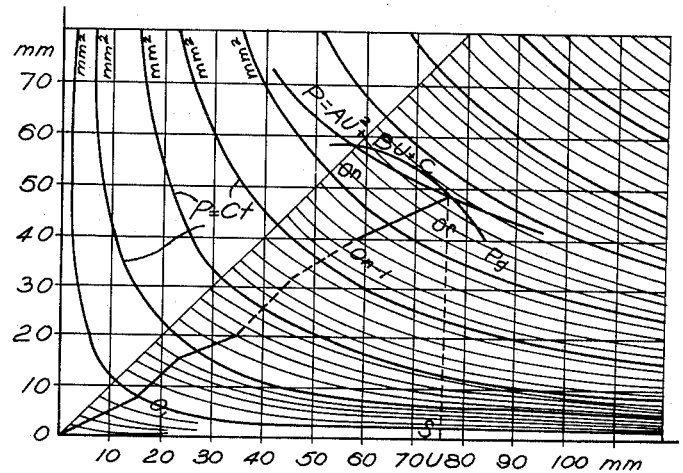
Fig 3
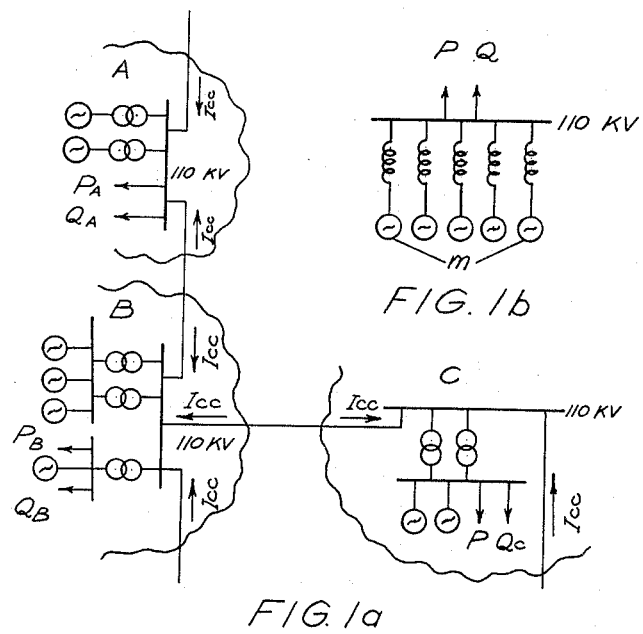
FIG. 1b
FIG. 1a

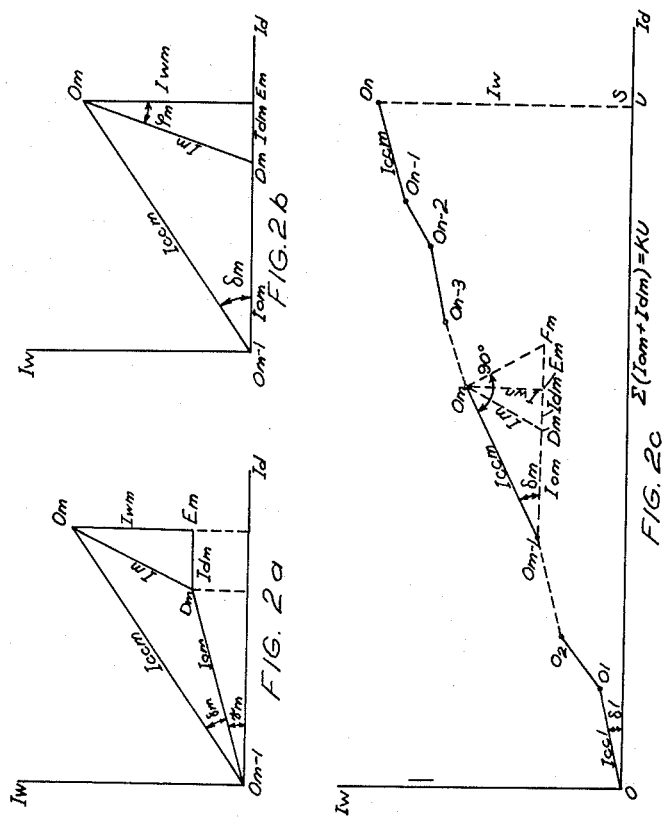

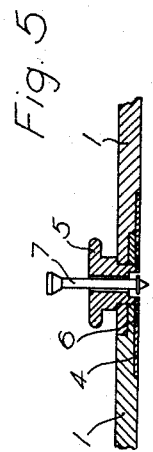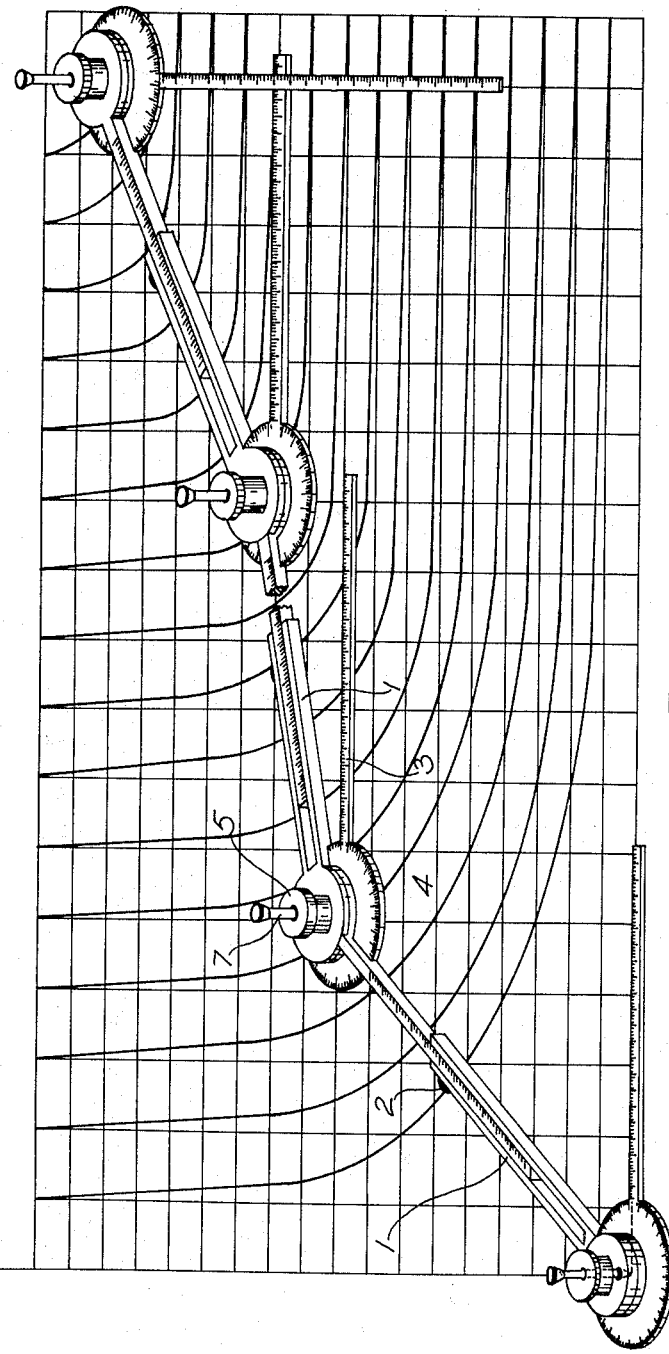

3,116,558
DEVICE DESIGNED FOR THE STUDY OF THE OPERATION OF ELECTRICAL POWER SYSTEMS
Gheorghe Paul Dimo, Bucharest, Rumania, assignor to Ministerul Minelor Si Energiei Electrice, Magheru, Rumania
Filed June 26, 1958, Ser. No. 782,987
5 Claims. (Cl. 33—76)

The present invention is a device for graphical analysis (graphical analyser), used for studying the problems concerning the operation of electrical power systems, including power stations and electrical transmission and distribution networks, such as statical and dynamical stability problems, control, and normal operation or failure.

Analytical methods are known for studying the operation of electrical power systems. These methods have the disadvantage of not being able to solve other than simple problems, as they are very cumbersome and inadequate for more complex studies.

Computers for direct and alternating currents are known. Such computers make it possible to solve the equations established by analytical methods. These computers do not take into account the physical aspects, of the apparatus under study, but solve the problems only from a numerical point of view. Besides such computers are rather costly.

Statical electrical network patterns are also known, for the study of transient and steady phenomena. Such patterns reproduce by similitude the conditions existing in the network. These patterns are disadvantageous as they give but the numerical results of the phenomenon under study, but give no indication concerning the functional dependence of magnitudes present. They are very costly too.

Dynamical patterns are also known using rotating elements (micro-networks) employed especially when the moment of inertia of the rotors of electrical machines are also being taken into account. Their disadvantage is that they are very complicated and equally costly.

The present inventor has made known (see the reviews: "Energetica," Bucharest, No. 10/1955, page 471; "Studii şi cercetări de Energetică," Bucharest, No. 1–2/1955, page 121 and No. 4/1956, page 505) some graphical methods of analysis which replace synchronous machines by short-circuit currents and are based on the following principles:

The analysis of any given electrical network is made by analysing in turn every junction separately.

In order to analyse a junction, all its links with the neighbouring junctions are cut (FIG. 1a) and the active and reactive powers absorbed at the junction are replaced by a single consumer the intake of which varies in dependence of the junction voltage U and follows as closely as possible the variations of the two replaced components. In a general manner, their variation law may be expressed by the following equations.

The active force:
$$P = AU^2 + BU + C$$

The reactive force:
$$Q = MU^2 + NU$$

where A, B, C, M and N are some constant factors, the values of which are dependent on the characteristics of the receivers determining the intake at the junction.

In order that the invention may be more fully understood, it will be described with reference to the accompanying drawings, wherein FIG. 1a illustrates diagrammatically three junctions, all of the connections of each with its neighboring junctions being severed;

FIG. 1b illustrates diagrammatically a single junction to which the active and reactive power of a number of synchronous machines is connected;

FIG. 2a is a graph representing a machine connected to a test junction-point through the impedance of the machine;

FIG. 2b is a graph representing a machine connected to a test junction-point through the reactance of the machine;

FIG. 2c is a graph representing a plurality of machines connected to a test junction point through their respective reactances;

FIG. 3 is a graph containing a family of hyperbolas plotted with respect to cordinates the abscissa of which represents reactive currents and the ordinate represents active currents;

FIG. 4 is a plan view, on an enlarged scale, of the graph shown in FIG. 3 with the analyzer shown thereon in perspective view; and FIG. 5 is a vertical cross-section through one of the joints between a pair of rulers of the analyzer.

With reference to FIG. 1, all generators feeding into the junction are replaced by vectors representing their short-circuit currents $I_{cc}$, and the cut links to the neighbouring junctions are replaced by vectors (fictitious generators) representing the short-circuit currents which might flow in from the neighbouring junctions (FIG. 1b), eventually with one consumer more. With reference to FIG. 1a, the three junctions shown are generally labeled A, B, and C, with their respective active powers labeled $P_A$, $P_B$, and $P_C$ and their respective reactive powers labeled $Q_A$, $Q_B$, and $Q_C$. In fact, for any generator $m$ the load short-circuit current is expressed by $$I_{ccm} = \frac{E_m}{Z_m} = Y_m E_m$$

and the no-load short-circuit current ($E = U$) is expressed by $$I_{om} = \frac{U}{Z_m} = Y_m U$$

where, $E_m$ represents the internal voltage of the machine;
$Z_m$—the impedance;
$Y_m$—the admittance.

The active and reactive currents produced by the generator $m$ are expressed as functions of the short-circuit currents, according to diagram of FIG. 2 by the equations $$I_{wm} = I_{ccm} \sin (\delta_m + \gamma_m) - I_{om} \sin \gamma_m$$
$$I_{dm} = I_{ccm} \cos (\delta_m + \gamma_m) - I_{om} \cos \gamma_m$$

in which $\delta_m$ is the internal phase angle between $E_m$ and U (rotor angle) and $\gamma_m$ is the phase angle of the impedance $Z_m$, defined by the tangent of $$\gamma_m = \frac{r}{x}$$

$r$ being the resistance and $x$ the reactance of the generator. If, for simplification, one considers $$r = 0 \text{ and } Z_m = X_m = \frac{1}{Y_m}$$

the result is $\gamma = 0$, the diagram takes the shape shown in FIG. 2b, and the currents become $$I_{wm} = I_{ccm} \sin \delta_m \frac{E_m}{Z_m} \sin \delta_m = Y_m E_m \sin \delta_m$$

$$I_{dm} = I_{ccm} \cos \delta_m - I_{om} = Y_m E_m \cos \delta_m - U$$

If at a junction several synchronous machines are connected generators, fictitious generators, motors of compensators and a single load directly at the junction, the working conditions are graphically represented by a chain of vectors $O_1, O_2, O_3 \ldots O_m \ldots O_n$ as shown in diagram of FIG. 2c.

The final point of the vector-chain represents the working point of the junction. The ordinate $$SO_n = I_w = \Sigma I_{wm}$$

represents the active load current of the junction, equal to the sum of the active currents of all generators. The abscissa $OS = \Sigma(I_{om} + I_{dm})$ represents the reactive load current of the junction (equal to the sum of the reactive currents of all generators), plus the entire no-load short-circuit current at the junction (equal to the sum of the no-load short-circuit currents of all generators). In the vector-chain diagram for every single generator, one may read the active and reactive currents, the no-load and load short-circuit currents, the internal phase angle $\delta_m$ and the power factor angle $\Phi_m$.

Supposing (which is practically the case) that the variation law of the reactive power, taken in at the junction, is given by the simplified expression $$Q = MU^2 = Y_e U^2$$

where $Y_e$ represents the equivalent admittance of the reactive load, one may put $$\Sigma I_{dm} = I_d = \frac{Q}{U} = Y_e U$$

Consequently, the abscissa OS of the working point may be expressed by the equation $$OS = \Sigma I_{om} + I_{dm}) = (\Sigma(Y_m + Y_e) U = KU$$

in other words, it may represent, on another scale, the voltage of the junction.

Should the reactive load of the junction vary according to another equation, including also some other terms, one might consider that the reactive power corresponding to all the other terms would be compensated by an equivalent synchronous compensator connected at the junction and the representation of the voltage U by the abscissa OS would remain valid.

The graphical procedure, though allowing a thorough study, in a suggestive manner, of the operation of power systems, is disadvantageous because it leads to intricate graphical constructions, thus becoming cumbersome and difficult in its practical use.

The device for the study of the operation of power systems (analyser) eliminates all these disadvantages and on the basis of the graphical procedure described above, allows an easy solving of all problems arising from the operation of power systems, by a simple and precise handling.

The device, according to the invention, has two main parts:

A chain of rulers of variable length, with joints between them, embodying from the mechanical point of view the chain of vectors of the mentioned graphical procedure;

A graph comprising two axes of coordinates, formed by a rectangular millimetric quadrille ruling, the ordinates of which being the active currents and the abscissae, the reactive currents and a family of equilateral hyperbolas representing the active powers (FIGS. 3 and 4).

As an example an analyser according to this invention is now described and a perspective view is given in FIG. 4, whilst FIG. 5 shows a cross-section of a joint.

The device comprises a certain number of articulated rulers 1, each one representing a vector $I_{ccm} = Y_m E_m$ which characterise in their turn a generator or a fictitious generator. The length of the rulers can be adjusted to be proportional to the admittance $Y_m$ times the load electromotive force $E_m$ of the generator.

Each ruler consists of two telescope-like components, telescoping one into the other, thus making possible the adjustment of the distance between the joints. All the rulers carry a scale for the direct reading of their length and one edge unites the articulation centres of each ruler in order to enable the direct drawing of the corresponding vector on the quadrille ruling. The profile of the two gliding elements of the ruler might be chosen so as to permit drawing the vector on the graph in a single continuous line, passing from one element to the other. The two telescoping elements of the ruler can be fixed in a desired position by a set screw 2.

Each ruler 1 has at its both ends an auxiliary ruler 3 joined to the ruler 1 at the point of articulation, which point represents the intersections $O_{m-1}$ and $O_m$ of vectors $I_{ccm}$ shown in FIG. 2c. The rulers 1 and 3 shown in FIG. 4 may be adjusted to represent the vectors of FIG. 2c, serving to close the triangle $O_{m-1}O_mD_m$ of the diagram of FIG. 2c. Alternatively, the ruler may be provided with only one auxiliary ruler pivotally attached at a point of juncture between the ruler 1, said point representing the intersection; $O_{m-1}$ of FIG. 2c, which by rotation might take any position required in order to form the sides $O_{m-1}D_m$, $O_mD_m$ or $O_mE_m$ as shown in FIG. 2c. Each ruler has in its $O_{m-1}$ joint a protractor 4, fixed or not to the auxiliary ruler, serving to measure the internal phase angle $\delta_m$. Each joint is provided with a fastening device comprising a knurl-header screw 5 and a screw-nut 6, permitting either to rigidise the joint or to let all the rulers of the joint move freely.

Each joint has also a slidable axial pin 7, one end of which is sharp-pointed and which may be driven into the wooden drafting table, thus fixing the joint in set position, and the axial pin 7 is drawn out, the joint is freed and may be easily moved about.

With the help of these arrangements one is able to effect the variation of any magnitude represented by a length or an angle in FIG. 2c, according to data of the problem studied with the analyser. All other magnitudes are kept invariable by fixing the positions of the joints of the adjustable rulers.

The device works on a special graph comprising first a millimetric quadrille ruling formed by horizontal straight lines representing by their ordinates the constant values of the active currents $I_W$ and by vertical straight lines representing by their abscissae the constant values of the reactive currents $I_d$ or $I_o$, the vertical straight line of the working point representing by its abscissa OS the voltage U of the junction to the current scale divided by the factor $K = (\Sigma Y_e + Y_g)$. On the same graph are also drawn a family of equilateral hyperbolas representing the constant values of the power when the voltage is varied by moving about the working point. Indeed, for a given current $I_w$, measured on the ordinate of the working point $O_m$, from equation $P = \sqrt{3} U I_w = k$ it follows that for the working point the ordinate is $$I_w = \frac{k}{\sqrt{3U}}$$

and the abscissa 13U. Therefore, it follows that $$UI_w = \frac{k}{\sqrt{3}}$$

The active and reactive powers respectively are read directly on the graph by measuring on the power scale the lengths represented by the active and reactive currents. This scale is given by the segment cut by the hyperbola $P = 1$ on the ordinate of the working point $O_m$, corresponding to the voltage U.

When the analyser is used for studying the working conditions of a junction, the rulers of the analyser are put in the position corresponding to a known working condition, defined by the various magnitudes related to each generator $m$; the active current $I_{wm}$ and the active power $P_m$ (length $O_mE_m$), the reactive current $I_{dm}$ and the reactive power $Q_m$ (length $D_mE_m$), the load short-circuit current $I_{ccm}$ (length $O_{m-1}O_m$), the no-load short-circuit current $I_{om}$ (length $O_{m-1}D_m$), the internal voltage $$\left(E_m = \frac{I_{ccm}}{Y_m}\right)$$

the internal phase angle $\delta_m$, the power factor angle $\Phi_m$, $\phi$, and by the magnitudes corresponding to the junction: the voltage U at the junction (length OS), the active current $I_w$ and the active power P (length $O_nS$), the reactive current $I_d$ and the reactive power Q (sum of the segments $D_mE_m$), all magnitudes being taken in their respective scales.

From the foregoing, it will be apparent that the analyser shown in FIG. 4 may be adjusted to lengths and positions representing the magnitudes and values shown on the graph of FIG. 2c. With certain values of working conditions known, the ruler 1 may be adjusted in length and pivoted about the axial pin 7 to represent these working conditions. Intersections between the rulers 1 and points on the special graph may then be read to effect the desired calculations. That is, with each ruler 1 representing a generator m, there being one ruler 1 for each generator in a given junction, calculations of conditions at that junction may be effected by adjusting the ruler positions to represent known values and deriving the values to be calculated from the special graph. For example, assuming that for all generators m in a given junction, the short-circuit current $I_{ccm}$ and the internal phase angle m are known, the length of each ruler may be adjusted to represent one value of $I_{ccm}$ and the angle of the ruler with the horizontal may be adjusted to represent an internal phase angle $\delta_m$. If there is one ruler 1 for each generator m in a junction, adjustment of all the rulers will form a graph such as shown in FIG. 2c to represent the conditions of the junction. Thus, assuming that all the rulers 1 have been properly adjusted in accordance with the known values ($I_{ccm}$ and $\delta_m$) mentioned above, the active current and the active power could be read directly from the special graph by reading the vertical length from the end of the last ruler 1 to the horizontal coordinate of the graph. This would correspond to the length $O_{ns}$ of FIG. 2c. The voltage U for the junction would be represented by the horizontal distance taken from the end of the last ruler 1 to the vertical coordinate of the special graph. This would represent OS of the graph of FIG. 2c. With the correlation between the values on the graph, and the positions and lengths of the analyser rulers of FIG. 4, taken as set forth in the preceding paragraph, many other calculations may be easily and speedily effected with the device of the present invention.

Then the magnitudes such as internal voltages, active and reactive forces, angles etc., the influence of which on the power system is studied, are being varied on the analyser and in the new position, taken up by the analyser, the values of the varied magnitudes under consideration are read.

If the variation law of the active force has been established in dependence of the voltage for the active load of the junction $$P_e = AU^2 + BU + C$$

this law is applied by drawing the corresponding curve on the graph and by moving the working point $O_n$ along this curve according to the variation of the different magnitudes, the influence of which is studied.

In the particular case in which $P_e = AU^2$ and consequently $B = C = 0$ (resistive consumers), the power curve is a straight line passing through the origin.

In the particular case in which $P_e = BU$, and consequently $A = C = 0$, the power curve is a straight line, parallel to the X-axis.

In the particular case in which $P_e = C = Ct$, and therefore $A = B = 0$, the power curve is an equilateral hyperbola.

In the general case, when $P_e = AU^2 + BU + C$ the power curve is obtained by adding the ordinates of the three mentioned curves.

Should the power of the junction vary according to another function, one can follow the movement of the working point, when different magnitudes intervening in the working of the power system vary, by drawing the curve representing this junction on the graph.

For the study of the statical stability of any generators of links at the junction (fictitious generators) and of the critical voltage at the junction, the rulers and the joints are fastened at the lengths and angles corresponding to the invariable magnitudes of the generators and the working point $O_m$ is moved by varying the rulers corresponding to the uncommitted magnitudes of the generators. Generally, the curve $P_g = f(U)$ thus followed by the working point $O_m$ cuts at two points the power curve $P_e = F(U)$ (see FIG. 3). One of these points is stable, the other is variable. The limit of the stability is reached when the two curves are tangent because in the corresponding working point the derivative of the respective function, $dP/du$, passes through zero changing its sign, this derivative having the same value for the generator and for the load, therefore, $$\frac{dP}{dU} = \frac{dP_g}{dU} - \frac{dP_e}{dU} = 0$$

in which $P_e$ represents the total power taken in at the junction and $P_g$ the total power of the generators.

If the stability of the power system is studied as function of some other criterion than $dP/dU$, the analyser may be used for the direct reading of the characteristic magnitudes, by forming geometrical figures by means of the principal and auxiliary rulers.

Thus, for the use of the stability criterion $dQ/dU$ according to the procedure indicated by the inventor in one of his works, by putting the auxiliary ruler to represent the line $O_mF_m$ of the FIG. 2c, at right angles to the main ruler, one may read directly the magnitude $O_{m-1}F_m$ required for computing of this derivative.

For all states of limit of stability, determined by the use of the analyser in dependence upon the various elements influencing the stability, or according to the various assumptions concerning the variation law of the power intake, one can determine the respective critical voltage of the junction, corresponding to all these limit states, by simply reading the abscissae of the respective working point.

For the study of the dynamic conditions, the vector chains $O_1 \ldots O_m$ corresponding to the successive conditions gone through by the junction at various time intervals $k$, are drawn on the graph, by means of the analyser. A divergent path of generator vector chains is thus obtained, representing the displacements in time of all generator rotors. So the calculation can be made step by step by reading directly for any given generator m the difference of power $\Delta P_{mk}$ between the preceding mechanical power and the electrical power at the beginning of the interval, as well as the increase of the angle $\Delta \delta k - 1$, during the preceding interval $(k-1)$, necessary for the calculation.

In addition to these successive working conditions, resulting from slow changes and causing the displacement of the generator rotors, the analyser may be also used for the study of sudden changes during which one may assume that the rotors do not change their positions, owing to their inertia.

In this case the rulers representing the generators remain identical in size and position before and after the sudden change, except these of the generators (or equivalent generators) causing themselves the change; for example, the sudden change of the admittance of the generator (or the equivalent generator) m from $Y_m$ to $Y'_m$, is expressed by the sudden change of the corresponding ruler from the length $Y_mE_m$ to $Y'_mE_m$.

By the sudden change of one of the admittances, the factor $K=\Sigma y$ changes too, and consequently the voltage and the power scales are equally changed.

A sudden change in the working conditions of the power system entails also an alteration of the active and the reactive powers of the junction. The new state may be represented by a rotation of the axis, the chain of generator rulers not intervening in the sudden change remaining unchanged.

Once the analyser is adopted to represent the new state, one may read with its help the unbalance of power resulting for every generator ($\Delta P_m$) and one may compute step by step as above, by drawing in the fan graph representing the displacements of the rotors after the sudden change.

The successive displacements of the X-axis to the various positions figured on the analyser, give the measure of the angular variation of the voltage U of the junction or the instantaneous variation of the frequency.

In order not to displace the graph by displacing the axis, in all problems concerning the dynamic stability, the successive positions of the chain of rulers are to be drawn on a second separate graph thus obtaining a fan on which to measure the angular displacement of the rotors, as well as the changes of the phase of the voltage U.

I claim:

1. A device for graphical analysis of the conditions of an electrical power system through analysis of the conditions measured at each junction point thereof, said device comprising an articulated series of rulers each corresponding to a power generator connected to the junction point, each ruler being adjustable to a length representing the short-circuit current of the generator to which it corresponds, calibrated pivot means for connecting said rulers operative to enable adjustment of each ruler to an angle representing the internal voltage phase of its corresponding generator, an auxiliary ruler fixed to said pivot means extending radially therefrom for defining additional representations of conditions of said junction point, slidable axial pins positioned at said pivot means, and graphical indicating means to which said series of articulated rulers and said auxiliary rulers are attachable through said slidable axial pins to be positionable relative thereto, said relative positioning operative to define points of intersection therebetween in a manner whereby said graphical indicating means indicates the voltage, active and reactive current, power and phase angle at the junction point.

2. A device for graphical analysis of the conditions of an electrical power system through analysis of the conditions measured at each junction point thereof, said device comprising an articulated series of rulers each corresponding to a power generator connected to the junction point, calibrated pivot means interconnecting said rulers, an auxiliary ruler fixed to said pivot means extending radially therefrom, graphical indicating means, and slidable axial pins at the points of articulation of said rulers to fix the junction points to points on said graphical indicating means, each of said rulers being adjustable to a length representing the short-circuit current of the generator to which it corresponds, said pivot means adaptable to permit adjustment of each ruler relative to said graphical indicating means to an angle representing the internal voltage phase of its corresponding generator, said pivot means further adaptable to permit adjustment of said auxiliary ruler relative to said graphical indicating means in a manner whereby the position of said articulated series of rulers and said auxiliary ruler relative to said indicating means defines points on said indicating means to give a representation of the voltage, active and reactive current, power and phase angle at the junction point.

3. A device according to claim 1, wherein said graphical indicating means comprise a graph upon which said series of rulers is disposed and adjustable, said graph containing coordinates the ordinates of which represent the active currents of the generators and the abscissas of which represent the reactive currents.

4. A device according to claim 3, wherein said calibrated pivot means comprise a protractor pivoted at each point of articulation for horizontal turning thereabout, and wherein said auxiliary ruler is fixed to and integral with said protractor extending radially outward therefrom for defining upon said graph additional representations of conditions of the junction point.

5. A device according to claim 3 wherein a family of equilateral hyperbolas is applied to said graph to represent the constant active forces at the junction point by their ordinate measurements.

References Cited in the file of this patent

UNITED STATES PATENTS

| | | |
|---|---|---|
| 378,257 | Leschorn | Feb. 21, 1888 |
| 1,560,747 | Weinback | Nov. 10, 1925 |
| 1,624,535 | Christianson | Apr. 12, 1927 |
| 2,042,213 | Ducey | May 26, 1936 |
| 2,364,153 | MacLeod | Dec. 5, 1944 |
| 2,448,410 | Baumgartner | Aug. 31, 1948 |
| 2,465,481 | Reiche | Mar. 29, 1949 |
| 2,821,027 | Billhimer | Jan. 28, 1958 |
| 2,874,476 | Tesson | Feb. 24, 1959 |